Figure 1:
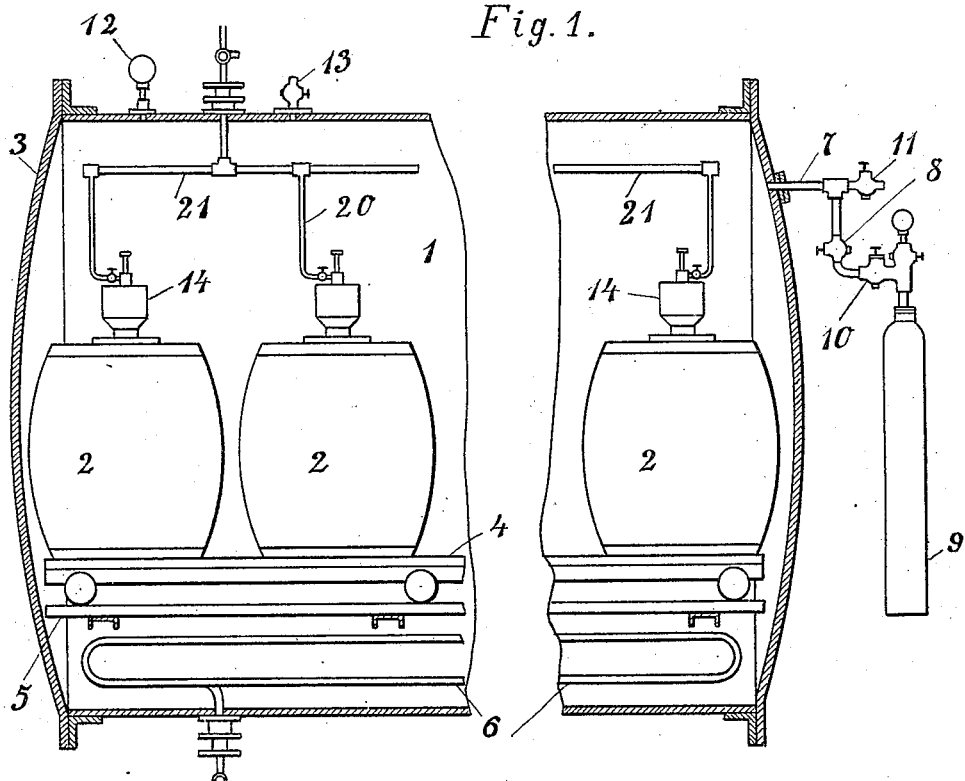

No. 838,721. PATENTED DEC. 18, 1906.
F. KNIPPING.
PROCESS OF PASTEURIZING BEER AND OTHER LIQUIDS HAVING
A GAS DISSOLVED THEREIN.
APPLICATION FILED AUG. 1, 1906.

Witnesses:
F. Meerganz
Mathilde Meergan

Inventor:
Franz Knipping
by Franz Reinhold
his Attorney.

UNITED STATES PATENT OFFICE.

FRANZ KNIPPING, OF BERLIN, GERMANY.

PROCESS OF PASTEURIZING BEER AND OTHER LIQUIDS HAVING A GAS DISSOLVED THEREIN.

No. 838,721.  Specification of Letters Patent.  Patented Dec. 18, 1906.

Application filed August 1, 1906. Serial No. 328,766.

*To all whom it may concern:*

Be it known that I, FRANZ KNIPPING, a citizen of the German Empire, residing at Berlin, O., Frankfurter Allee 180, Germany, have invented certain new and useful Improvements in Processes of Pasteurizing Beer and other Liquids Having a Gas Dissolved Therein; and I do hereby declare the following to be a full, clear, and exact description of the invention, such as will enable others skilled in the art to which it appertains to make and use the same.

My invention relates to improvements in a process of pasteurizing beer and other liquids having a gas dissolved therein; and the object of my improvements is to provide a process whereby the liquid can be pasteurized in comparatively weak receptacles, such as barrels made of glass, without the necessity of providing inconvenient means to prevent the receptacle from being burst by the increase of pressure resulting from an increase of the temperature of the liquid and the gas dissolved therein.

In the following specification the process will be described as applied to the pasteurization of beer, though it will be evident that it applies equally to other liquids containing a gas.

For the purpose of pasteurizing beer the latter is heated to about 70° centigrade. With such an increase of temperature a considerable increase of pressure is connected, whereby frequently the receptacles containing the beer become leaky, so that the beer is spoiled.

Now my invention consists in pasteurizing the beer in a receptacle while maintaining an equal pressure inside and outside the receptacle, and for this purpose I place the receptacles within a closed container, such as a boiler, and heat them while they are open. At the same time I maintain a pressure of a permanent gas, such as carbonic-acid gas, within the container, and thereby also within the receptacles, from the beginning of the process to the end of the same, when the beer is cooled off again, which pressure is sufficient to prevent the escape of the carbonic-acid gas of the beer. It will be apparent that the pressure required will increase from about one or two atmospheres when the beer is cold to about three or four atmospheres when the beer is heated to 70° centigrade. However, for convenience I prefer to apply the maximum pressure from the beginning to the end of the process. It will readily be understood that the inner and outer pressures exerted on the receptacle are absolutely alike, so that the latter cannot be injured. Moreover, an escape of carbonic-acid gas cannot take place on account of the pressure exerted on the beer.

I will now proceed to describe as an example an apparatus wherein my improved process can be carried out and which is provided with such an armature as is desirable for a satisfactory function.

Figure 2:
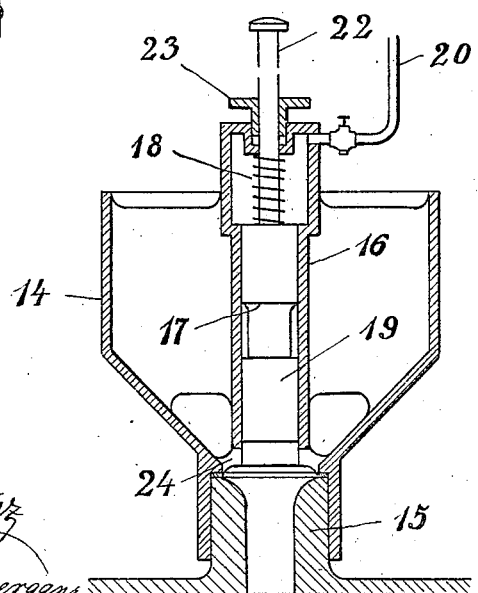

In the accompanying drawings, Figure 1 is a vertical cross-section through the apparatus; and Fig. 2 is a vertical cross-section through a detail, on an enlarged scale, illustrating a means to close the receptacles while the container is still closed.

Similar letters of reference refer to similar parts throughout the views.

An air-tight container or boiler 1 is provided with an opening through which receptacles 2 can be put into the same and which can be closed in an air-tight manner by a door or cover 3, any preferred means being provided to lock the latter. The receptacles are placed on a wagon 4, which is guided on suitable rails 5 within the container. Appropriate means are provided to heat the container to the desired temperature of 70° centigrade, which means in the present example consist of a coiled tube 6, connected to a steam-boiler. (Not shown.) By a pipe 7, adapted to be closed by a valve 8, the container is connected with a means to provide a constant pressure. In the example illustrated a carbonic-acid flask 9 is provided for this purpose, which is connected to the pipe 7 through a pressure-reducing valve 10, adjusted to maintain the desired pressure within the container. A safety-valve 11 is arranged to blow off when the pressure within the container exceeds the maximum required in the process to prevent the escape of carbonic-acid gas from the beer. The pressure within the container can always be examined by a suitable pressure-gage 12. When the process is finished and the beer cooled off, the pressure within the container can be let off by a valve 13.

I prefer to provide a means whereby the receptacles 2 are closed before the container is opened in order to avoid the escape of carbonic acid of the beer and to prevent impurities from getting into the receptacles. For this purpose I use the plugging apparatus shown in Fig. 2. It consists of a preferably funnel-shaped vessel 14, adapted to be attached to a cylindrical stud 15, forming the plug-hole. Into said vessel the beer will rise when its temperature, and thereby its volume, is increased, and it will flow back again when the temperature is decreased. Within said vessel and in line with the plug-hole there is a cylinder 16, open below and closed at its top, having a piston 17 sliding therein. The latter is normally held in its upper retracted position by a spring 18, so that a plug 19 can be put in the lower part of the cylinder. The upper part of the cylinder is connected by an elastic tube 20 and a pipe 21, common to all the receptacles, to a compressor or the like, whereby fluid-pressure can be applied to the upper side of the piston, so that the latter is pushed downward, and thereby drives the plug into its hole. The piston is provided with a piston-rod 22, extending through a stuffing-box 23, whereby it can be driven down when by accident the fluid-pressure device has failed to act.

In order to carry my process into effect, the plug of each of the receptacles 2 is removed, and the vessel 14, with a plug 19 in its cylinder 16, is screwed to the stud 15. The receptacles 2 are moved into the container 1, and the cylinders 16 are connected to the pipe 21 by the elastic tube 20. After closing the door 3 carbonic-acid gas from the flask 9 is preferably first blown through the container 1 while the valve 13 is open, whereby the air contained in the boiler is driven out. After a while the latter is closed, so that the pressure rises to about three or four atmospheres. Now steam is admitted to the coiled tubes 6, and the temperature within the container 1 is raised to about 70° centigrade. The pressure produced thereby within the receptacles will never exceed three or four atmospheres, according to what pressure the safety-valve 11 and the reducing-valve 10 are adjusted. A small amount of the beer will rise into the vessel 14 through small apertures 24, provided in the lower part of the cylinder 16. When the process of pasteurization is finished, the steam is shut off, so that the beer gradually cools, while the pressure is still maintained. Thereafter compressed fluid is admitted to the upper side of the piston 17, which drives the plug 19 down into its hole. Now the pressure can be released by opening the valve 13, the door 3 can be opened, and the receptacles 2 taken out of the container.

It will be observed that during the entire process carbonic acid cannot escape from the beer. The walls of the receptacles are not at any moment subjected to any strain whatever on account of the uniform pressure inside and outside the receptacle, and any beer that escapes through the plug-hole flows back again into the receptacle when the temperature is decreased.

I claim—

1. The process of pasteurizing liquids having a gas dissolved therein, which consists in placing the open receptacle containing the liquid within a closed container, and heating said container and receptacle while producing a pressure of a permanent gas within said container sufficient to prevent the escape of gas from said liquid.

2. The process of pasteurizing liquids having a gas dissolved therein, which consists in placing the open receptacle containing the liquid within a closed container, admitting a gas similar to that dissolved in the liquid into said container, and heating said container and receptacle while producing a pressure within the container sufficient to prevent the escape of gas from said liquid.

In testimony whereof I hereunto affix my signature in the presence of two witnesses.

FRANZ KNIPPING.

Witnesses:
  OTTO MÖLCK,
  MAX SCHWENDERLING.